United States Patent
Sundararaman et al.

(10) Patent No.: US 11,868,475 B1
(45) Date of Patent: Jan. 9, 2024

(54) SYSTEM AND METHODS FOR LATENCY REDUCTION FOR FUSE RELOAD POST RESET

(71) Applicant: Marvell Asia Pte, Ltd., Singapore (SG)

(72) Inventors: Ramacharan Sundararaman, San Jose, CA (US); Nithyananda Miyar, San Jose, CA (US); Martin Kovac, Newmarket (CA); Avinash Sodani, San Jose, CA (US); Raghuveer Shivaraj, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 338 days.

(21) Appl. No.: 17/086,371

(22) Filed: Oct. 31, 2020

Related U.S. Application Data

(60) Provisional application No. 63/020,678, filed on May 6, 2020.

(51) Int. Cl.
 *G06F 21/57* (2013.01)
 *G06F 9/4401* (2018.01)
(52) U.S. Cl.
 CPC .......... *G06F 21/575* (2013.01); *G06F 9/4401* (2013.01)
(58) Field of Classification Search
 CPC ....... G06F 21/575; G06F 9/4401; G06F 21/57
 See application file for complete search history.

(56) References Cited

U.S. PATENT DOCUMENTS

| | | | |
|---|---|---|---|
| 2002/0083316 A1* | 6/2002 | Platenberg | G06F 9/4416 713/2 |
| 2015/0100792 A1* | 4/2015 | Hartley | H04N 21/4432 713/189 |
| 2017/0168844 A1* | 6/2017 | Swanson | G06F 21/577 |
| 2018/0031632 A1* | 2/2018 | Blankenburg | G01R 31/31705 |
| 2018/0095692 A1* | 4/2018 | Natu | G06F 3/0685 |
| 2018/0095897 A1* | 4/2018 | Upasani | G06F 21/6218 |
| 2018/0167199 A1* | 6/2018 | Kaul | G09C 1/00 |
| 2020/0050581 A1* | 2/2020 | Pinilla Pico | G06F 15/8023 |

\* cited by examiner

*Primary Examiner* — Quazi Farooqui

(57) ABSTRACT

A new approach is proposed that contemplates systems and methods to support post reset fuse reload for latency reduction. First, values of fuses are read once and stored into one or more load registers on an electronic device, wherein the load registers are protected. Once the values of the fuse are loaded into the load registers, a valid indicator of the load registers is set indicating that the values have been successfully loaded into the load registers. When other components of the electronic device need to access these values, the other components will check the load registers first. If it is determined that the valid indicator of the load registers is set, the stored values are read from the load registers instead of from the fuses. If the valid indicator of the load registers is not set, the values are loaded again from the fuses into the load registers.

25 Claims, 3 Drawing Sheets

300

Read values from a plurality of fuses in a fuse component, wherein each fuse of the plurality of fuses is a functional block configured to maintain a value programmed into the each fuse during fabrication and/or hardware reset of an electronic device
302

↓

Load the values of the plurality of fuses in the fuse component into one or more load registers on the electronic device, wherein the one or more load registers are configured to store the values from the plurality of fuses in the fuse component to be accessed by other components of the electronic device
304

↓

Set a valid indicator on the one or more load registers to indicate whether the values stored in the one or more load registers are valid and can be read or accessed by the other components of the electronic device
306

↓

Enable the other components of the electronic device to access the values loaded into the one or more load registers instead of reading the values from the plurality of fuses in the fuse component upon a reset of the electronic device if the valid indicator is set to be valid
308

FIG. 3

SYSTEM AND METHODS FOR LATENCY REDUCTION FOR FUSE RELOAD POST RESET

CROSS-REFERENCE TO RELATED APPLICATIONS

This application claims the benefit and the priority to the U.S. Provisional Patent Application No. 63/020,678, filed May 6, 2020, which is incorporated herein in its entirety by reference.

BACKGROUND

In computing, an on-chip fuse or efuse (referred to hereinafter as "fuse") is an one-time programmable (OTP) functional block with one or more fuse values programmed or "hard-coded" into the functional block during fabrication of a chip and cannot be changed after the chip has finished being manufactured. The fuse allows for the dynamic real-time reprogramming of the chip and provide on-chip performance tuning of the chip while it is in operation.

Currently, a fuse is often used to improve security of an electronic device or chip. If certain sub-systems of the electronic device fail, or are taking too long to respond, or are consuming too much power, the electronic device needs to be reset. Each reset of the electronic device has to access a set of bits of the fuse in order to read code from the fuse as part of a security boot flow of the reset process of the electronic device. Accessing the fuse during reset, however, is often very time consuming as it may take a large amount of clock cycles, e.g., 80 ms, to access and read the code from the fuse, thus resulting in high latency and significant slowdown execution of the entire reset process. Additionally, reliability of the fuse may become an issue since each fuse can only be accessed a limited number of times.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a flowchart of an example of a process to support post reset fuse reload for latency reduction according to an aspect of the present embodiments.

DETAILED DESCRIPTION

Figure 1:
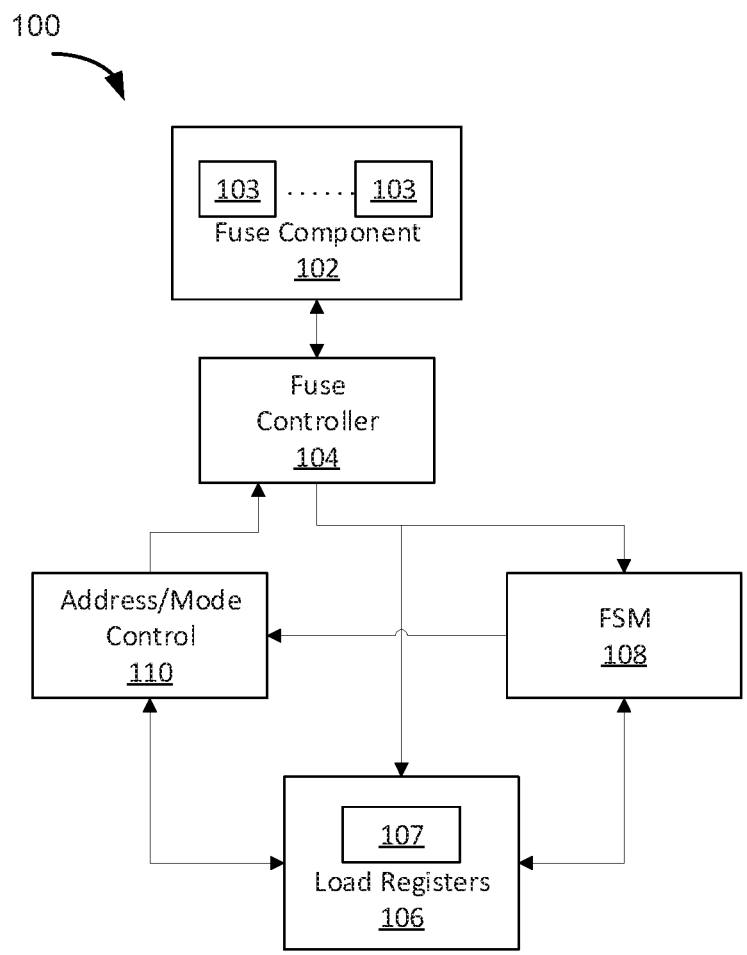
FIG. 1 depicts an example of a diagram of a system configured to support post reset fuse reload for latency reduction according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support post reset fuse reload for latency reduction. First, actual values of fuses are read once and stored into one or more load registers on an electronic device, wherein the load registers are protected, e.g., they can only be read by other components within the electronic device and cannot be accessed externally. Once the actual values of the fuse are loaded into the load registers, a valid indicator of the load registers is set indicating that the values have been successfully loaded into the load registers. When other components or processes of the electronic device need to access these values, the other components or processes will check the load registers first. If it is determined that the valid indicator of the load registers is set, the stored values are read from the load registers instead of reading them from the fuses. If the valid indicator of the load registers is not set, then the values are loaded again from the fuse into the load registers and the valid indicator of the load registers is set before the values are read from the load registers.

Under the proposed approach, any software reset of a system does not need to read from the fuse anymore since the values of the fuse are stored in and are accessible through the load registers. In fact, the values of the on-chip fuse are not read from the fuse again until and unless a system or hard reset happens, which is a hardware operation that re-initializes the core hardware components of the system thus ending all current software operations in the system. Here, the system being reset can be a computing or an electronic device external to fuse and the load registers. Since the load registers run at the same clock speed as the system being reset, the latency associated with accessing and reading values from the load registers is much lower compared to reading the values from the fuse, which happens at a slower speed. Additionally, security and reliability of the fuse is improved under the proposed approach because the number of fuse accesses is greatly reduced.

FIG. 1 depicts an example of a diagram of a device 100 configured to support post reset fuse reload for latency reduction. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the device 100 includes at least a fuse component/block 102, a fuse controller 104, one or more load registers 106, and a finite state machine (FSM) 108. Each of these components in the device 100 is a dedicated hardware block/component or a software running on such hardware block/component. In some embodiments, one or more of these components are programmable by a user at a host (not shown) via software instructions for various operations. When the software instructions are executed, the one or more hardware components becomes a special purposed hardware component for practicing certain functions. In some embodiments, the components of the device 100 is on a single chip, e.g., a system-on-chip (SOC).

In the example of FIG. 1, the fuse component 102 comprises a plurality of on-chip fuses 103, wherein each of the on-chip fuses 103 is functional block configured to maintain a value programmed or "hard-coded" into the fuse during fabrication and/or reset of a system, e.g., a computing or an electronic device, which can be but is not limited to a SOC or CPU outside of the device 100. In some embodiments, the values of the fuses 103 in the fuse component 102 are one-time programmable (OTP), e.g., the values can be programmed or written once after the chip has finished being manufactured. In some embodiments, the plurality of fuses 103 in the fuse component 102 are located consecutively in a memory of the device, e.g., 256 fuses each of 32 bits in width starting from an address in the memory. In the example of FIG. 1, the fuse controller 104 is configured to control access to the plurality of fuses 103 in the fuse component 102 by other components on the device 100.

In the example of FIG. 1, the one or more load registers 106 are configured to store the current values of the plurality of fuses in the fuse component 102 to be accessed by other components of the system upon a reset of the system. Since the one or more load registers 106 run/operate at the same clock speed as the rest of the system/components outside of the device 100 (in some embodiments, the one or more load registers 106 are the only block of the device 100 expected to operate at that speed and of the other blocks of the device 100 operate at much lower clock speed), accessing the one or more load registers 106 therefore achieves a much lower latency compared to accessing the plurality of fuses in the fuse component 102. In some embodiments, the values of fuses 103 in the fuse component 102 that have been read and stored into the one or more load registers 106 are protected, e.g., the values stored in the one or more load registers 106 are read-only by other components outside of the device 100 without write permission. In some embodiments, no access to the one or more load registers 106 by any component external to the device 100 is allowed. In some embodiments, the one or more load registers 106 can only be loaded or written by a hardware component of an agent such as a CPU/SoC external/outside of the device 100, wherein such agent is specifically authorized and configured to load or write values into the load registers 106 to protect the load registers 106 from malicious access and to improve security of the device 100.

Once the values of the fuses 103 in the fuse component 102 are loaded into the one or more load registers 106, any subsequent need for those values are read from the one or more load registers 106 instead of the fuse component 102 itself. For non-limiting examples, for any software reset of the system, there is no need to read from the fuse component 102 anymore since the values of the fuses 103 in the fuse component 102 have been stored and are accessible through the one or more load registers 106.

In some embodiments, when there is a hard reset of the system outside of the device 100, the values of the fuses in the fuse component 102 need to be re-loaded into the one or more load registers 106 again in order to maintain coherency of the fuse data in the one or more load registers 106. In some embodiments, the FSM 108, which can be but is not limited to a secure firmware, is configured to initiate a writing operation or a write to load values from the fuses 103 in the fuse component 102 to the one or more load registers 106 via the fuse controller 104 immediately after a hard reset. During the hard reset, the FSM 108 gets exclusive access to the fuse controller 104 via exclusive access to the address/mode control module 110 and no read from the one or more load registers 106 during the re-loading is allowed. In some embodiments, the FSM 108 is a life cycle state (LCS) FSM, which reads in values of a LCS fuse of the fuses 103 (e.g., 32-bits starting from address 0x0) to determine the current life cycle state of the system being reset. Depending on the current LCS of the system, the FSM 108 is configured to block or lock access as well as read operations to the one or more load registers 106 during the time the one or more load registers 106 are loaded with contents/values from the plurality fuses 103 in the fuse component 102.

Once the FSM 108 finishes re-loading fuse values from the fuse component 102 as well as when the values of all fuses 103 are loaded into the one or more load registers 106, it releases the fuse controller 104 by sending a fuse loading complete signal, e.g., fn_fuse_done, to the fuse controller 104 to continue the hard reset/power up of the system. Note that it is important for the security of the system outside of the device 100 for the LCS state and the fuse values to be loaded and locked before the system is released from reset, which happens after the fn_fuse_done signal is asserted. In some embodiments, the FSM 108 is configured to set a valid indicator, e.g., a valid bit for the one or more load registers 106 to indicate whether the values stored in the one or more load registers 106 are valid and may be read or accessed by other components of the device 100 or not. If the valid indictor of the one or more load registers 106 is set (e.g., its value is "1"), the values stored in the one or more load registers 106 are valid and may be read or accessed by other components of the device 100. If the valid indicator of the one or more load registers 106 is not set (e.g., its value is "0"), then the values of the one or more load registers 106 need to be reloaded from the plurality of fuses 103 in the fuse component 102 before the one or more load registers 106 can be accessed by other components of the device 100. In some embodiments, a write operation to one of the OTP fuses 103 of the fuse component 102 may result in clearing the valid indicator of the load register 106, so that stale values are not consumed by other components of the device 100 or one or more secure firmware entities. In some embodiments, each of the secure firmware entities is configured to initiate a reload from the fuse component 102 to the load registers 106 to improve security or to go through a reset, if necessary, which will achieve the same effect.

In some embodiments, a software interface 107 is provided by the one or more load registers 106, wherein the software interface 107 can utilize the address/mode control module 110 to access the fuses 103 in the fuse component 102 via the fuse controller 104. In order to enable a write operation to the one or more load registers 106, the address/mode control module 110 is configured to utilize the software interface 107 to write correct values to a first register (e.g., MATCH_CODE_0) immediately followed by a second register (e.g., MATCH_CODE_1) of the load registers 106. In some embodiments, an address/mode control module 110 is configured to handle/process one or more requests from the one or more load registers 106 and/or the FSM 108 and translates the requests to instructions/requests to the fuse controller 104. Based on the one or more requests from the address/mode control module 110 the fuse controller 104 is configured to produce a 1-bit and/or multi-bit output from the plurality of fuses 103 of the fuse component 102. The 1-bit and/or multi-bit (e.g., 32-bit) output is then provided to the FSM 108, which configures and stores value of the output to the load registers 106 as a result of the write operation or write to the one or more load registers 106 from the plurality of fuses 103 in the fuse component 102. In some embodiments, the address/mode control module 110 is configured to detect bad fuse values in the one or more load registers 106, wherein such bad values are either invalid, out of date, or corrupted (e.g., due to limitations of the fuse controller 104) and cannot be used to reset the external system.

In some embodiments, the one or more load registers 106 are implemented as a directly mapped memory wherein the memory is word addressable and each read operation or read to the load registers 106 returns a word (e.g. 32-bits) of data starting from the initial read address. In some embodiments, write operations or writes to the load registers 106 are done in a similar manner as the read operations, wherein 32-bits of data is programmed into the load registers 106 starting from the accessed address. For each bit of a load register 106, writing 1 will program/update the corresponding bit of the load register 106 while writing 0 will have no effect. In some embodiments, the load registers 106 can be loaded in parallel during a write operation.

Figure 2:
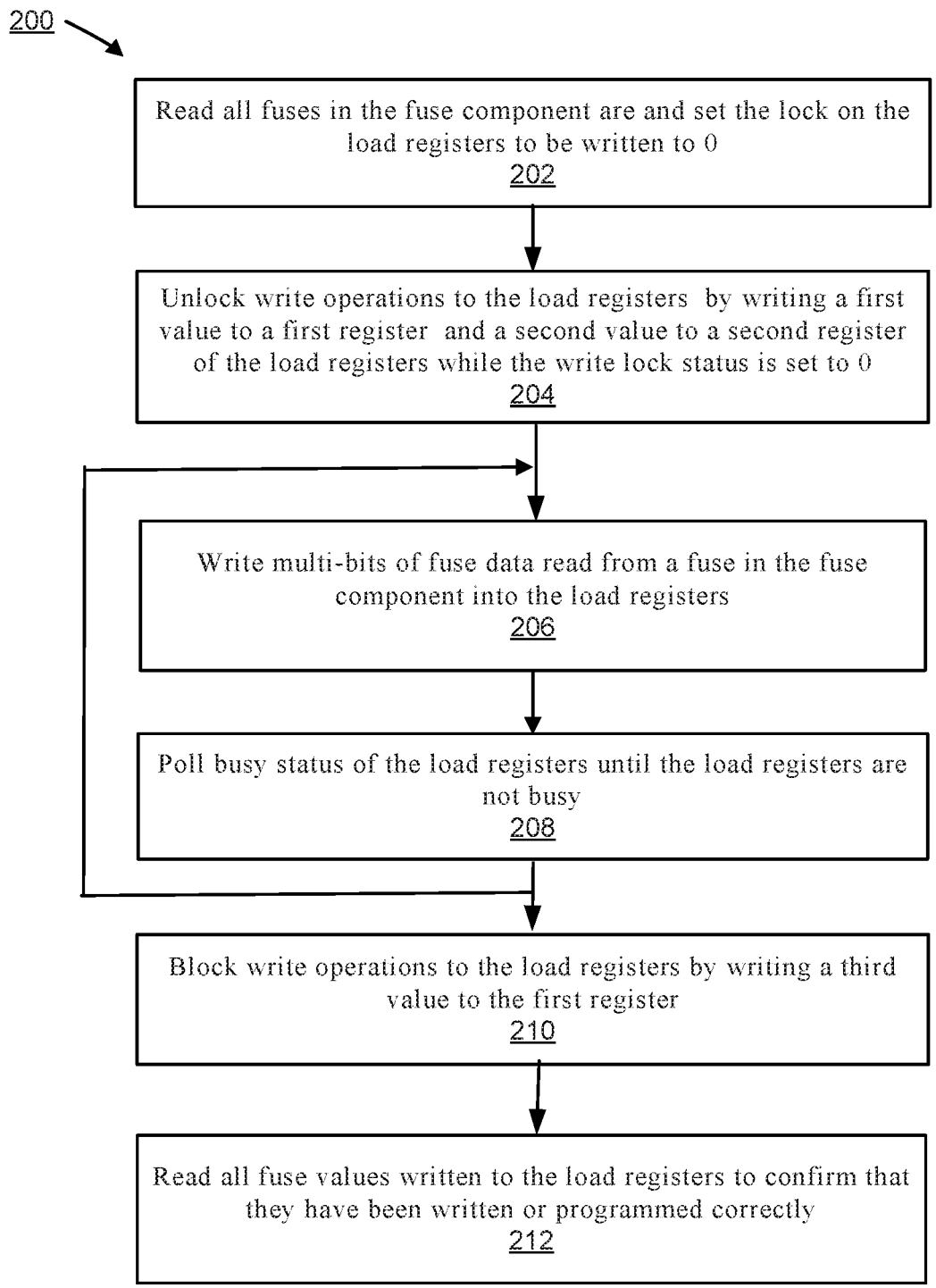
FIG. 2 depicts a flowchart of an example of a process to support writing operations to the load registers according to an aspect of the present embodiments.

FIG. 2 depicts a flowchart 200 of an example of a process to support writing operations to the load registers 106. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where all fuses 103 in the fuse component 102 are read and locks on the load registers 106 to be written/loaded are set to 0. The flowchart 200 continues to block 204, where write operations to the load registers 106 are unlocked by writing a first value (e.g., 0x6b31_f445) to the first register (e.g., MATCH_CODE_0) and a second value (e.g., 0x7bb3_a849) to the second register (e.g., MATCH_CODE_1) of the load registers 106 while the write lock status is set to 0. The flowchart 200 continues to block 206, where 32-bits of fuse data read from a fuse 103 in the fuse component 102 is written into the load registers 106. The flowchart 200 continues to block 208, where busy status of the load registers 106 is polled until the load registers 106 are not busy. Repeat blocks 206 and 208 until data read from all fuses in the fuse component 102 are written to the load registers 106. The flowchart 200 continues to block 210, where write operations to the load registers 106 are blocked by writing a third value (e.g., 0x0) to the first register. The flowchart 200 ends at block 212, where all fuse values written to the load registers 106 are read to confirm that they have been written or programmed correctly.

FIG. 3 depicts a flowchart 300 of an example of a process to support post reset fuse reload for latency reduction. In the example of FIG. 3, the flowchart 300 starts at block 302, where values are read from a plurality of fuses in a fuse component, wherein each of plurality of fuses is a functional block configured to maintain a value programmed into the fuse during fabrication and/or hardware reset of an electronic device. The flowchart 300 continues to block 304, where the values of the plurality of fuses in the fuse component are loaded into one or more load registers on the electronic device, wherein the one or more load registers are configured to store the values from the plurality of fuses in the fuse component to be accessed by other components of the electronic device. The flowchart 300 continues to block 306, where a valid indicator is set on the one or more load registers to indicate whether the values stored in the one or more load registers are valid and can be read or accessed by the components of the electronic device. The flowchart 300 ends at block 308, wherein the components of the electronic device are enabled to access the values loaded into the one or more load registers instead of reading the values from the plurality of fuses in the fuse component upon a reset of the electronic device if the valid indicator is set to be valid.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support post reset fuse reload, comprising:
   a one-time programmable fuse component comprising a plurality of fuses, wherein each fuse of the plurality of fuses is a functional block configured to maintain a value programmed into the each fuse during fabrication and/or hardware reset of an electronic device;
   one or more load registers on the electronic device, wherein the one or more load registers are configured to store the values loaded from the one-time programmable fuse component subsequent to the one-time programmable fuse component being programmed during fabrication and/or hardware reset, wherein the values are accessible through the one or more load registers by other components of the electronic device; and
   a finite state machine (FSM) configured to
   read the values from the plurality of fuses in the fuse component;
   load the values of the plurality of fuses in the fuse component into the one or more load registers;
   set a valid indicator on the one or more load registers to indicate whether the values stored in the one or more load registers are valid and can be read or accessed by the other components of the electronic device; and
   enable the other components of the electronic device to access the values loaded into the one or more load registers.

2. The system of claim 1, further comprising:
   a fuse controller configured to control access to the plurality of fuses in the fuse component by the other components on the electronic device.

3. The system of claim 2, further comprising:
   an address/mode control circuitry configured to process one or more requests from the one or more load registers and/or the FSM and translate the one or more requests to instructions to the fuse controller to control access to the plurality of fuses in the fuse component by the other components on the electronic device.

4. The system of claim 3, wherein:
the address/mode control circuitry is configured to reload the values into the one or more load registers from the plurality of fuses in the fuse component before the one or more load registers can be accessed by the components of the electronic device if the valid indicator of the one or more load registers is not set.

5. The system of claim 3, wherein:
the address/mode control circuitry is configured to access the one or more load registers via a software interface to determine that the values stored in the load registers are valid.

6. The system of claim 5, wherein:
the address/mode control circuitry is configured to detect bad fuse values in the one or more load registers, wherein such bad values are either invalid, out of date, or corrupted.

7. The system of claim 5, wherein:
the FSM is configured to utilize the software interface to write correct values to a first register followed by a second register of the load registers in order to enable a write operation to the one or more load registers.

8. The system of claim 1, wherein:
the values of the plurality of fuses in the fuse component are one-time programmable (OTP) and can be programmed or written once after being manufactured.

9. The system of claim 1, wherein:
the values stored in the one or more load registers are read-only by the other components within the electronic device without write permission.

10. The system of claim 1, wherein:
no access to the one or more load registers by a component external to the electronic device is allowed.

11. The system of claim 1, wherein:
the one or more load registers are only to be loaded or written by a hardware component of the electronic device to protect the load registers from malicious access and to improve security of the electronic device.

12. The system of claim 1, wherein:
the FSM is configured to initiate a writing operation to load the values from the plurality of fuses in the fuse component to the one or more load registers immediately after a hard reset in order to maintain coherency of fuse data in the one or more load registers.

13. The system of claim 12, wherein:
the FSM is configured to block or lock access as well as read operations to the one or more load registers during the time the one or more load registers are loaded with the values from the plurality of fuses in the fuse component.

14. A method to support post reset fuse reload, comprising:
reading values from a plurality of fuses in a one-time programmable fuse component, wherein each fuse of the plurality of fuses is a functional block configured to maintain a value programmed into the each fuse during fabrication and/or hardware reset of an electronic device;
subsequent to the one-time programmable fuse component being programmed during fabrication and/or hardware reset, loading the values from the fuse component into one or more load registers on the electronic device, wherein the one or more load registers are configured to store the values from the one-time programmable fuse component to be accessed by other components of the electronic device instead of the one-time programmable fuse component;
setting a valid indicator on the one or more load registers to indicate whether the values stored in the one or more load registers are valid and can be read or accessed by the other components of the electronic device; and
enabling the other components of the electronic device to access the values loaded into the one or more load registers.

15. The method of claim 14, further comprising:
processing one or more requests from the one or more load registers and translating the one or more requests to instructions to a fuse controller to control access to the plurality of fuses in the fuse component by the other components on the electronic device.

16. The method of claim 15, further comprising:
reloading the values into the one or more load registers from the plurality of fuses m the fuse component before the one or more load registers can be accessed by the components of the electronic device if the valid indicator of the one or more load registers is not set.

17. The method of claim 15, further comprising:
accessing the one or more load registers via a software interface to determine that the values stored in the load registers are valid.

18. The method of claim 16, further comprising:
detecting bad fuse values in the one or more load registers, wherein such bad values are either invalid, out of date, or corrupted.

19. The method of claim 16, further comprising:
utilizing the software interface to write correct values to a first register followed by a second register of the load registers in order to enable a write operation to the one or more load registers.

20. The method of claim 14, further comprising:
restricting the values stored in the one or more load registers as read-only by other components within the electronic device without write permission.

21. The method of claim 14, further comprising:
allowing no access to the one or more load registers by an component external to the electronic device.

22. The method of claim 14, further comprising:
loading or writing the one or more load registers only by a hardware component of the electronic device to protect the load registers from malicious access and to improve security of the electronic device.

23. The method of claim 14, further comprising:
initiating a writing operation to load the values from the plurality of fuses in the fuse component to the one or more load registers immediately after a hard reset in order to maintain coherency of fuse data in the one or more load registers.

24. The method of claim 23, further comprising:
blocking or locking access as well as read operations to the one or more load registers during the time the one or more load registers are loaded with the values from the plurality of fuses in the fuse component.

25. A system to support post reset fuse reload, comprising:
a one-time programmable fuse component comprising a plurality of fuses, wherein each fuse of the plurality of fuses is a functional block configured to maintain a value programmed into the each fuse during fabrication and/or hardware reset of an electronic device; and
one or more load registers on the electronic device, wherein the one or more load registers are configured to store the values loaded from the one-time programmable fuse component subsequent to the one-time programmable fuse component being programmed during fabrication and/or hardware reset, wherein the values are accessible through the one or more load registers by other components of the electronic device.

* * * * *